(12) United States Patent
Spandern et al.

(10) Patent No.: US 7,954,608 B2
(45) Date of Patent: Jun. 7, 2011

(54) FRICTION LINING

(75) Inventors: Christian Spandern, Elkenroth (DE);
Michael Hofmann, Limburg (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/571,565

(22) Filed: Oct. 1, 2009

(65) Prior Publication Data

US 2010/0018816 A1    Jan. 28, 2010

Related U.S. Application Data

(63) Continuation of application No. PCT/DE2008/000473, filed on Mar. 18, 2008.

(30) Foreign Application Priority Data

Apr. 2, 2007    (DE) .......................... 10 2007 015 880

(51) Int. Cl.
*F16D 65/12*    (2006.01)

(52) U.S. Cl. ................................................ 188/218 XL
(58) Field of Classification Search ............ 188/218 XL; 192/107 M; 428/37, 66.2, 2
See application file for complete search history.

(56) References Cited

U.S. PATENT DOCUMENTS 4,244,994 A * 1/1981 Trainor et al. .................. 428/37
6,365,257 B1 * 4/2002 Hecht ............................. 428/37

FOREIGN PATENT DOCUMENTS

| DE | 16 00 044 Y | 11/1970 |
| DE | 10 2004 038 773 Y | 3/2005 |
| GB | 2 002 466 YQ | 2/1979 |
| GB | 2 056 369 Y | 3/1981 |
| GB | 2 269 640 XY | 2/1994 |
| WO | 2007/121704 PX | 11/2007 |

* cited by examiner

*Primary Examiner* — Melanie Torres Williams

(57) ABSTRACT

The invention relates to a method for producing a friction lining. Said friction lining is wound in three layers with different winding ratios.

10 Claims, 1 Drawing Sheet

FRICTION LINING

This application is a Continuation of PCT/DE2008/000473 filed Mar. 18, 2008, which in turn claims the priority of DE 10 2007 015 880.9 filed Apr. 2, 2007, the priority of both applications is hereby claimed and both applications are incorporated by reference herein.

The invention relates to a friction lining and to methods for producing a friction lining, in particular for clutch disks, brakes or the like.

PRIOR ART

Clutch linings of this type are used, in particular, for friction clutches in motor vehicles, in which they are riveted to a metallic carrier plate or clutch disk, in order in the coupled state, in conjunction with a counterelement, to allow a transfer of force between an engine and a transmission or, with the clutch open, to decouple this.

The clutch linings must in this case satisfy stringent requirements because they are to fulfill several requirements which cannot readily be achieved in the same way. In particular, the clutch lining should have a high bursting rotational speed so as not to be destroyed by centrifugal forces, possess a high coefficient of friction by means of which a high torque can be transferred, at the same time have low wear and be resistant to form-changing distortion due to heat and/or the influences of force. The clutch linings should nevertheless be capable of being produced in as uncomplicated a way as possible and therefore economically.

To increase the bursting strength, that is to say the strength of the clutch lining in the circumferential direction, it is already known to deposit binder-impregnated yarn material circumferentially in a wavy manner in a plurality of flat plies, turns of the strand material having radially inner and radially outer reversal regions which lie on concentric circles (DE 44 20 291 B4). In particular, the reversal regions of the turns may be distributed in each case on a plurality of concentric circles having different diameters, the radii of the circles differing from one another sufficiently to avoid thickenings at the margins of the clutch lining or lining body which may otherwise lead to damage caused by pressure on the yarn material. The fraction of yarn material in the overall composition of the lining body material can consequently be increased.

Winding takes place mostly with the aid of a winding machine, according to the definition one ply being wound per revolution in the circumferential direction.

Figure 1:
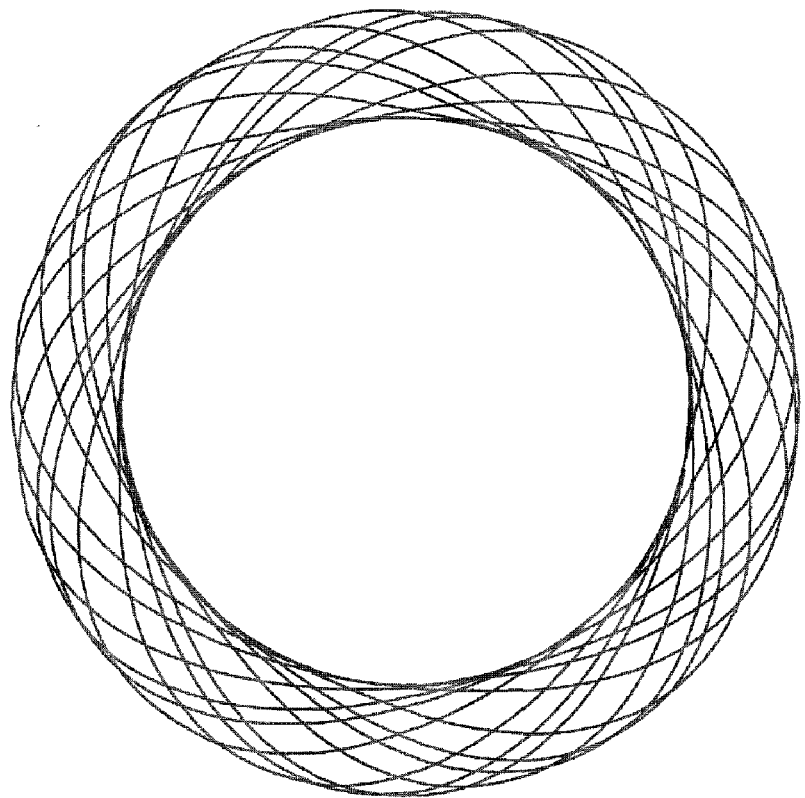

Such yarn material wound in the form of an annular disk, as shown, for example, in FIG. 1, is also designated as a winding or prepressing. The imaginary circle having an outside diameter of the friction part in the form of an annular disk is itself also designated as the outside diameter of the winding, and the same applies to the inside diameter. The radially inner and radially outer reversal regions of the turns on the yarn material wound in the form of an annular disk are tangent to the inside and the outside diameter of the winding.

The winding ratio indicates how often the yarn is tangent in each case to an imaginary circle having an outside diameter of the friction part in the form of an annular disk or of the dimensionally similar reinforcing part or, in other words, how often the yarn is tangent to the outside diameter during a revolution of an annular part. A winding ratio of 1:2.6 describes the yarn touching the outside diameter 2.6 times during one revolution on account of the turns. A winding ratio of 1:4 is in this case lower than a winding ratio of 1:5 and is not to be interpreted in the sense of a division.

Set Object

The object on which the invention is based is to propose a friction lining, the set-up of which allows a further improvement in terms of rotational speed strength and dimensional stability.

The method according to the invention provides for producing a friction lining from at least one winding, the winding being wound from a plurality of plies of at least one impregnated yarn. In this case, a first predetermined number of plies which form a first layer is wound with a first predetermined winding ratio. Subsequently, a second predetermined number of plies which form a second layer is wound with a second predetermined winding ratio. Finally, a third predetermined number of plies which form a third layer is wound with a third predetermined winding ratio.

In a preferred embodiment, the first and the third predetermined number of plies are equal. This number preferably lies between 3 and 7, 4 plies are particularly preferred. The second predetermined number preferably also lies between 3 and 7 and particularly preferably amounts to 6.

In a further preferred embodiment, the first and the second and the third predetermined number of plies are equal. The first and the second and the third predetermined number in this case preferably lie between 3 and 7 and particularly preferably amount to 5.

In a preferred embodiment, the second winding ratio is unequal to the first and the third winding ratio.

In a preferred embodiment, the second winding ratio is lower than the first and the third winding ratio.

The first and the third winding ratio are preferably equal.

In a particularly preferred embodiment, the first and the third winding ratio lie between 1:4.5 and 1:5.0 and particularly preferably amount to 1:4.72, and the second winding ratio lies between 1:1.0 and 1:1.3 and particularly preferably amounts to 1:1.12.

To improve the frictional or wearing properties, the first and/or the third layer are/is wound from a friction yarn, and the remaining layers are wound from a reinforcing yarn. The friction yarn in this case possesses the better frictional or wearing properties than the reinforcing yarn.

According to the method described above, a friction lining can thus be produced with the appropriate specifications with regard to layering, to the number of plies per layer, to the winding ratios and to the yarn type.

According to a further solution for achieving the object, a further method according to the invention and a friction lining are proposed. This method according to the invention provides for producing a friction lining from at least one winding which is wound from a plurality of plies of at least one impregnated yarn, according to the invention each ply having a different winding ratio.

In a preferred embodiment, such a winding is wound from 2 to 20 plies, particularly preferably from 5 to 15 plies.

In a further preferred embodiment, the winding ratio of plies wound directly in succession in time or, in other words, of in each case two plies, of which the yarn portions forming them directly follow one another topologically along the yarn, differs in each case by the amount of an incremental or decremental predetermined value. This incremental or decremental predetermined value amounts to between 1:0.1 and 1:0.5, preferably to between 1:0.2 and 1:0.4. The winding ratio in this case increases or decreases from ply to ply by the amount of this predetermined value, depending on whether winding was commenced with a low or a high winding ratio. In this case, the predetermined interval lies between 1:1.0 and 1:6.0, particularly preferably between 1:2.0 and 1:5.0, and constitutes the predetermined maximum and minimum occurring winding ratio of the plies. Commencing with the first ply which, for example, has a winding ratio of 1:2.0, the second ply would have a winding ratio of 1:2.3 if the predetermined incremental value amounted to 1:0.3. The third and the fourth ply consequently have a winding ratio of 1:2.6 and 1:2.9, and so forth, until the maximum value of, for example, 1:5.0 is reached.

In a further embodiment, the winding ratio of the plies wound directly in succession in time or of plies following one another topologically along the yarn run is defined in that it is selected by determining a random number within a predetermined time interval which corresponds to the predetermined maximum and minimum occurring winding ratio of the plies. In this case, the predetermined interval lies between 1:1.0 and 1:6.0, particularly preferably between 1:2.0 and 1:5.0.

In a further embodiment, there may be provision for no winding ratio to occur several times, in which case the next random number is generated.

According to the invention, the transition from one winding ratio to another winding ratio takes place when the outside diameter of the winding is reached or, alternatively, when the inside diameter of the winding is reached, during the winding operation, immediately before or, alternatively, after a ply is wound completely, that is to say before or after the last turn, which no longer belongs completely to the ply to be currently wound, is wound.

A further alternative involves a passage through the middle between the inside and the outside diameter.

Figure 3:
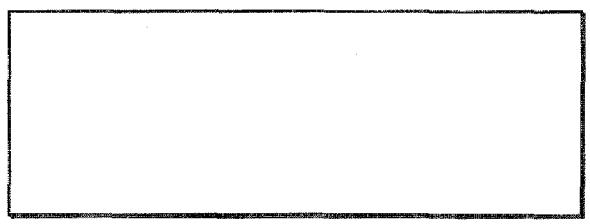

A further alternative involves overshooting a predetermined angle in the circumferential direction of the winding by means of the yarn layering device, so that all the plies change the winding ratio in this position. This position is also described by a plane through the annular winding, as illustrated in FIG. 3. In such an embodiment, all the yarn portions passing through this plane change their winding ratio there, and a new ply commences.

An abrupt, but also non-abrupt smooth transition from one winding ratio to another winding ratio on the outside or the inside diameter or in the positions alternatively described is possible.

According to the invention, a transition from one winding ratio to another winding ratio is provided in a predetermined transitional region. This transitional region may amount to 60 degrees in the circumferential direction. The transition from one winding ratio to another winding ratio may in this case commence, for example, 30 degrees before the outside diameter or the alternative positions are reached, and may have assumed the new value of the winding ratio 30 degrees after the outside diameter is reached.

In a special embodiment of the method according to the invention, there is provision for a winding ratio, which is provided for the next ply to be wound, to be checked, for example with the aid of a computer program, as to whether a maximum number of yarn portions has thereby reached the inside or the outside diameter within a predetermined extent in the circumferential direction, which number should not be overshot in order to avoid an excessive overlaying of the material. In this case, the maximum number provided is 2 to 10, particularly preferably 5, and the extent in the circumferential direction is 0.1 to 30 degrees and particularly preferably 10 degrees.

According to the method described above, a friction lining with the appropriate specifications with regard to winding ratios and to the transition between different winding ratios can thus be produced.

Figure 2:
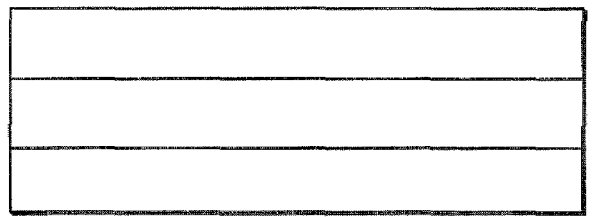

Further advantages and advantageous refinements of the invention are the subject matter of the following figures and their description parts. In the figures, in particular, FIG. 1 shows a winding according to the prior art, FIG. 2 shows a schematic cross section perpendicularly to the circumferential direction of a three-layer winding, FIG. 3 shows a schematic cross section perpendicularly to the circumferential direction of a winding.

FIG. 1 illustrates a winding according to the prior art.

Such a winding may be wound, for example, from an impregnated yarn. In this case, a yarn optimized in terms of coefficient of friction and of wear is drawn through an impregnating solution and is brought to a constant weight ratio of yarn to impregnating solution. The yarn is subsequently dried. For example, a carded yarn consisting of aramid fibers, glass staple fibers, viscose fibers and PAN fibers and also brass wire may be used. Another example is a mixed filament yarn consisting of glass filament and metal wires. The various yarns may also be used as a combination. A dispersion consisting of polymeric components, fillers and solvents is suitable as an impregnating solution. The polymeric components may consist of thermosetting components, such as, for example, phenol resin or melamine resin, and also elastomeric components, such as, for example, SBR or NBR rubber. Fillers are, for example, barium sulphate, kaolin or soot. The solvent usually used is water. The dried yarn is subsequently wound into a winding.

To improve the friction lining properties, a winding may also be constructed from a plurality of layers of different types of impregnated yarn. First, for example, a lower layer and then, for example, a layer lying above it with another yarn are wound. In this case, the winding ratios of the two layers may differ from one another.

Usually, a winding produced in this way is subsequently pressed under time and temperature control then hardened and deburred and finally ground and drilled.

FIG. 2 illustrates schematically a three-layer winding according to the invention. The two outer layers are in this case wound with a winding ratio of 1:4.72. The middle layer has a winding ratio of 1:1.12. The three layers consist in this example of 5 plies in each case.

In order to produce a friction lining from such a winding, in a preferred embodiment the method according to the invention provides for winding the 3 layers from a coherent piece of yarn. The first 5 plies which form the first layer are wound with a winding ratio of 1:4.72. The second 5 plies which form the second layer are wound with a winding ratio of 1:1.12. Finally, once again, 5 plies, which form a third layer, are wound with a winding ratio of 1:4.72 from the coherent piece of yarn.

In a further preferred embodiment, the method according to the invention provides for winding the first 5 plies, which form the first layer with a winding ratio of 1:4.72, from a coherent piece of yarn. Subsequently, 5 plies, which form the second layer, are again wound with a winding ratio of 1:1.12 from a coherent yarn which is not identical to the yarn of the first layer. Finally, once again, 5 plies, which form a third layer, are wound with a winding ratio of 1:4.72 from a coherent piece of yarn which is identical to the yarn material of the first layer, but does not form a coherent piece with the yarn of the first layer.

Depending on the intended use, the 3 layers may be wound from yarn optimized in terms of wear or yarn optimized in terms of rotational speed. In this case, the three layers may be wound from one, two or three or even more than three coherent pieces of yarn.

In a preferred embodiment, the middle second layer is omitted, so that the winding consists only of the first and the third layer with a winding ratio in each case of between 1:4.5 and 1:5.0, particularly preferably 1:4.7, one of the two layers consisting of yarn optimized in terms of wear, and the other of the two layers consisting of a yarn optimized in terms of bursts in rotational speed.

FIG. 3 illustrates the cross section perpendicularly to the circumferential direction of an annular winding which consists of plies in each case having a different winding ratio.

In a preferred embodiment, the winding ratio of plies wound directly in succession in time or, in other words, in each case of two plies, of which the yarn portions forming them directly follow one another topologically along the yarn, differs in each case by the amount of an incremental or decremental predetermined value. This incremental or decremental predetermined value may be in the range of between 1:0.1 and 1:0.5, preferably between 1:0.2 and 1:0.4. The winding ratio in this case increases or decreases from ply to ply by the amount of this predetermined value, depending on whether winding was commenced with a low or a high winding ratio. The predetermined interval in this case preferably lies between 1:2.0 and 1:5.0.

Commencing with the first ply, which has a winding ratio of 1:2.0 in a preferred embodiment, the second ply has a winding ratio of 1:2.3, since the predetermined incremental value amounts to 1:0.3 in this embodiment. The third and the fourth ply therefore have a winding ratio of 1:2.6 and 1:2.9, and so forth, until the maximum value of 1:5.0 is reached in the eleventh ply.

The number of plies may be varied by means of suitable values for the maximum and minimum occurring winding ratio and the incremental or decremental value.

In a further preferred embodiment, an annular winding is likewise produced which consists of plies having in each case a different winding ratio. This is achieved, using random numbers from an interval of between 1:2.0 and 1:5.0 for the winding ratio. In order to avoid repetition, a random number intended as a winding ratio for a ply is discarded if this random number comes too near to a winding ratio already provided previously for another ply, that is to say the difference in amounts between the two values undershoots a predetermined threshold value of between 1:0.1 and 1:0.5, preferably of 1:0.3.

In a further preferred embodiment, the transition from one winding ratio to another winding ratio takes place when the outside diameter is reached during the winding operation immediately before a ply is wound completely, that is to say before the last turn, which no longer belongs completely to the ply to be currently wound, is wound.

In this case, a non-abrupt smooth transition from one winding ratio to another winding ratio takes place on the outside diameter, without a kink in the yarn run occurring during a change in the winding ratio.

According to the invention, a transition from one winding ratio to another winding ratio is provided in a predetermined transitional region. This transitional region may amount to 60 degrees in the circumferential direction. In a preferred embodiment, the transition from one winding ratio to another winding ratio commences 30 degrees before the outside diameter is reached and has assumed the new value of the winding ratio 30 degrees after the outside diameter is reached.

These methods, however, do not make it possible to rule out the situation where a plurality of reversal regions of turns of the yarn come to lie axially one above the other at several points on the outside or inside diameter in the circumferential direction, which may lead to undesirable thickenings at the margins of the clutch lining and may cause damage due to pressure on the yarn material. In a further preferred embodiment, this can be avoided in that, for example immediately after defining a winding ratio provided for the next ply, it is determined at which point on the outside or the inside diameter the reversal regions of the turns of the ply associated with this winding ratio would have come to lie. In addition, it is determined whether a plurality of other reversal regions of previously wound plies are already located or lie one above the other at these points. An extent in the circumferential direction of 0.1 to 30 degrees, preferably of 10 degrees, is in this case selected as a reversal region. If more than a maximum number of preferably 5 reversal regions of already wound plies coincide or lie one above the other in the circumferential direction within this region, the value for the winding ratio of the next ply to be wound is discarded, a new value is defined, and it is determined whether the maximum number of overlaps of the reversal regions is fulfilled.

In a further embodiment, a complete simulation of a possible winding is carried out on the basis of the above-described method by means of the storage of the plies, the winding ratio of which does not infringe upon the above-mentioned criteria. The winding obtained by simulation is subsequently formed by means of a winding machine.

In a further embodiment, too frequent overlays of yarn material, not only on the inside and the outside diameter, but over the entire annular surface, can be avoided by simulation, in that test surfaces delimited radially and in the circumferential direction and running parallel to the intended top side and underside of the winding obtained are checked at predetermined intervals along the next ply to be wound for the number of overlays, and the checked ply linked to the associated winding ratio is accepted or rejected. The winding thus obtained is subsequently formed by means of a winding machine.

The invention claimed is:

1. A method for producing a friction lining for clutches or brakes comprising:
at least one winding, the winding being wound from a plurality of plies of at least one impregnated yarn,
wherein a first predetermined number of plies with a first predetermined winding ratio, which form a first layer, a second predetermined number of plies with a second predetermined winding ratio, which form a second layer, and a third predetermined number of plies with a third predetermined winding ratio, which form a third layer, are wound, at least two of three layers having a different predetermined number of plies, wherein the first and the second and the third predetermined number of plies are between 3 and 7.

2. The method of claim 1, wherein the first and the third predetermined number of plies are equal.

3. The method of claim 1, wherein the second winding ratio is unequal to the first and the third winding ratio.

4. The method of claims 1, wherein the second winding ratio is lower than the first and the third winding ratio.

5. The method of claim 1, wherein the first and the third winding ratio are equal.

6. The method of claim 1, wherein the first and the third winding ratio amount to between 1:4.5 and 1:5.0, and the second winding ratio amounts to between 1:1.0 and 1:1.3.

7. The method of claim 1, wherein the first and/or or the third layer are/is wound from a friction yarn, and remaining layers are wound from a reinforcing yarn, the friction yarn having better frictional and/or wearing properties than the reinforcing yarn.

8. The method of claim 2, wherein the first and the third predetermined number of plies are 4, and the second predetermined number of plies is 6.

9. The method of claim 1, wherein the first and the third winding ratio amount to 1:4.72, and the second winding ratio amounts to 1:1.12.

10. A friction lining for clutches or brakes, comprising:
at least one winding, the winding consisting of a plurality of plies of at least one impregnated yarn,
wherein a first predetermined number of plies which are wound with a first predetermined winding ratio form a first layer, a second predetermined number of plies which are wound with a second predetermined winding ratio form a second layer, and a third predetermined number of plies which are wound with a third predetermined winding ratio form a third layer, at least two of three layers having a different predetermined number of plies, wherein the first and the second and the third predetermined number of plies are between 3 and 7.

* * * * *